United States Patent [19]

Suzuki et al.

[11] Patent Number: 5,974,932
[45] Date of Patent: *Nov. 2, 1999

[54] APPARATUS FOR CUTTING A RUNNING WORKPIECE

[75] Inventors: Katsuyoshi Suzuki, Gamagori; Itaru Yamamura, Anjo; Masahiko Yamamoto, Kariya; Yuzi Furuno, Okazaki; Tamotu Sugiura, Anjo; Shigehide Ishikawa, Hoi-gun; Mineo Suzuki, Hekinan, all of Japan

[73] Assignee: Aisin Seiki Kabushiki Kaisha, Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/710,253

[22] Filed: Sep. 13, 1996

[30] Foreign Application Priority Data

Sep. 13, 1995 [JP] Japan .................................... 7-235258
Sep. 29, 1995 [JP] Japan .................................... 7-253857

[51] Int. Cl.$^6$ .................................................. B26D 5/00
[52] U.S. Cl. .......................... 83/745; 83/76; 83/318; 83/567; 83/743
[58] Field of Search ............................. 83/318, 319, 320, 83/447, 436.9, 75.5, 308, 309, 567, 743, 745, 76

[56] References Cited

U.S. PATENT DOCUMENTS

| | | | |
|---|---|---|---|
| 1,469,245 | 10/1923 | Baxter | .................................... 83/436.9 |
| 3,315,714 | 4/1967 | Meier | ........................................ 83/745 |
| 3,750,512 | 8/1973 | Gotham et al. | ........................... 83/447 |
| 3,771,393 | 11/1973 | Gatto et al. | . |
| 3,808,928 | 5/1974 | Plegat | ........................................ 83/318 |
| 4,350,065 | 9/1982 | Hayashi et al. | . |
| 4,932,299 | 6/1990 | Haines et al. | ............................. 83/447 |
| 4,979,410 | 12/1990 | Kusakabe | .................................. 83/319 |
| 5,092,512 | 3/1992 | Sturrus et al. | . |
| 5,097,576 | 3/1992 | Kadono et al. | ........................... 83/318 |
| 5,104,026 | 4/1992 | Sturrus et al. | . |
| 5,148,847 | 9/1992 | Knerr | ....................................... 83/75.5 |
| 5,243,888 | 9/1993 | Bowlin | ................................... 83/75.5 |
| 5,305,625 | 4/1994 | Heinz | ...................................... 83/308 |

FOREIGN PATENT DOCUMENTS

| | | |
|---|---|---|
| 22 04 566 | 1/1973 | Germany . |
| 30 42 897 | 6/1981 | Germany . |
| 43 08 777 | 9/1994 | Germany . |
| 44 42 526 | 2/1996 | Germany . |
| 7-10457 | 2/1995 | Japan . |

*Primary Examiner*—M. Rachuba
*Assistant Examiner*—Sean A. Pryor
*Attorney, Agent, or Firm*—Oblon, Spivak, McClelland, Maier & Neustadt, P.C.

[57] ABSTRACT

An apparatus for cutting running workpiece includes a cutter for cutting, while the workpiece is running, the workpiece continuously supplied to run in a direction, and a travel member secured to the cutter, movable along the workpiece in contact with the workpiece. Since the travel member movable along the workpiece in contact with the workpiece is secured to the cutter, the cutter can follow a workpiece which is straight, curving or curving with a changing curvature. The cutter can be supported to be two-dimensionally movable to cut the workpiece in any form.

4 Claims, 11 Drawing Sheets

APPARATUS FOR CUTTING A RUNNING WORKPIECE

BACKGROUND OF THE INVENTION

1. Field of the Invention

This invention relates to an apparatus and a method for cutting a running workpiece.

2. Description of Related Art

Japanese Patent Publication (KOKOKU) No. 7-10,457 discloses a typical apparatus for cutting running workpiece. The apparatus includes a stationary table, a guide rail disposed on the stationary table and extending in the same direction as the running direction of the workpiece, a cutter disposed as to be linearly movable along the guide rail for cutting the workpiece while the workpiece is running, and a cutter driver for driving the cutter with the same speed and in the same direction as the traveling speed of the workpiece. The cutter thus cuts the workpiece while being driven by the cutter driver in synchronous movement with the workpiece.

Such a cutter can follow the workpiece when it moves in a straight line. However, it is difficult to follow a workpiece whose curvature changes unless the guide rail and the cutter driver are replaced. Moreover, the guide rail needs to be formed in a shape matching the curvature of the workpiece, or the cutter driver has to be designed to drive the cutter on the curving guide rail, so that the structure of the apparatus is complicated. It is thus very difficult to drive the cutter on a curving line.

SUMMARY OF THE INVENTION

It is an object of the invention to provide an apparatus having a simple structure capable of cutting a workpiece having a curvature or a changing curvature while the workpiece is running.

According to this invention, the apparatus for cutting a running workpiece includes a cutter for cutting the running workpiece, and a travel member secured to the cutter and movable along the workpiece in contact with the workpiece. Since the travel member movable along the workpiece in contact with the workpiece is secured to the cutter, the cutter can follow any workpiece, whether straight, curving or curving with a changing curvature. As a result, the cutting apparatus can cut any workpiece in any form while the workpiece is running.

In a preferred embodiment, the travel member includes a housing secured to the cutter, and a rotary member rotatably supported to the housing in contact with the workpiece for making the housing run along the workpiece. The rotary member rotatable in contact with the workpiece causes the housing to run, so that the cutter and the housing can run smoothly. A pushing member is preferably formed for pushing the workpiece toward the rotary member while the workpiece is running. The pushing member provides a predetermined pressure onto the rotary member while the workpiece is running, thereby preventing the rotary member from separating from the workpiece while the cutter is driven.

The cutting apparatus is preferably formed with a rotary member drive apparatus for stopping the rotary member while the workpiece is being cut and rotating the rotary member in the opposite direction to the running direction of the workpiece and with a higher speed than the running speed direction of the workpiece while the workpiece is not being cut until the cutter returns to an initial position thereof and in the opposite direction to the running direction of the workpiece with the same speed as the running speed of the workpiece when the cutter returns to the initial position thereof.

With this rotary member drive apparatus, the rotary member is stopped during cutting of the workpiece, so that the contact pressure from the pushing member causes the cutter to run synchronously with the workpiece. When the workpiece is not subject to cutting, the rotary member is rotated in the opposite direction to the running direction of the workpiece with a higher speed than the running speed of the workpiece until the cutter returns to an initial position thereof, and therefore the cutter moves in the opposite direction to the running direction of the workpiece with the same speed as the running speed of the workpiece so that the cutter can surely be returned to the initial position.

When the cutter returns to the initial position, the rotary member is rotated in the opposite direction to the running direction of the workpiece with the same speed as the running speed of the workpiece, so that the cutter is maintained at the initial position.

The pushing member, in a preferred embodiment, may include a travel body supported to the housing so as to move toward and away from the workpiece, and a free roller rotatably supported to the housing in engagement with the workpiece. Since the travel body supports the free roller in rotational contact with the workpiece, the cutter can run smoothly on the workpiece.

In another aspect of the invention, a cutting apparatus includes a cutter for cutting the continuously running workpiece and a support member for supporting the cutter in a manner that the cutter is two-dimensionally movable. Because the support member supports the cutter so that the cutter is two-dimensionally movable, the cutter can follow any workpiece, whether straight, curving or curving with a changing curvature. As a result, the cutting apparatus can cut any workpiece in any form while the workpiece is running.

According to a preferred embodiment, the support member includes a supporting body, a first travel member supported by the supporting body to be movable in a first direction, and a second travel member being supported by the first travel member to be movable in a second direction and supporting the cutter. With this support member, the cutter can be moved in first and second directions in the same plane. The cutter may be rotatably supported by the second travel member to cut any curving workpiece precisely. The cutting apparatus can be formed with a first drive member for driving the first travel member, a second drive member for driving the second travel member, a control apparatus for controlling speeds of the first and second drive members so that the cutter is made synchronous with the continuously running workpiece. With this constitution, the speeds of the first and second drive members are controlled so that the cutter is reliably made synchronous with the workpiece.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

First Embodiment

Figure 1:
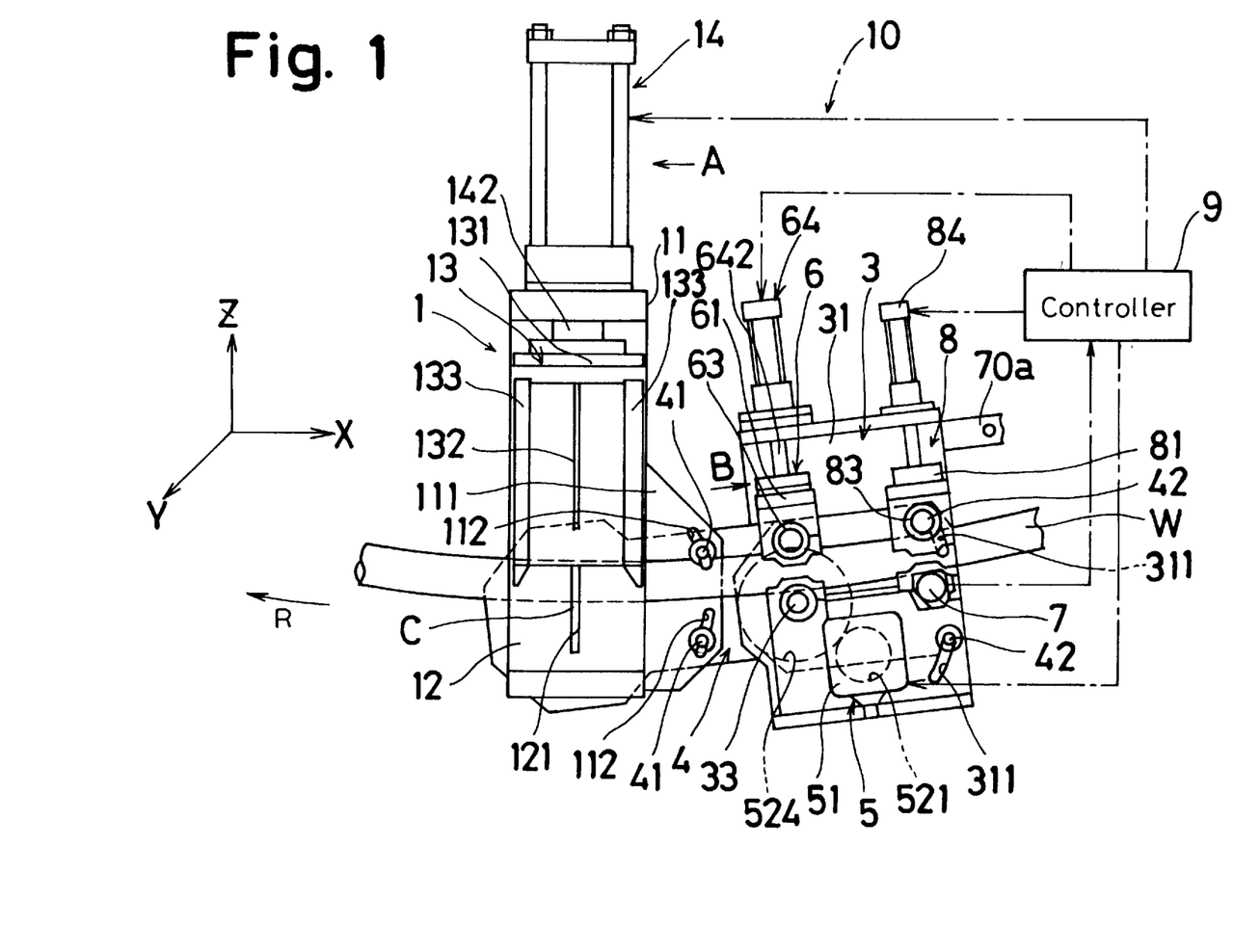
FIG. 1 a front view showing an apparatus for cutting a workpiece while the workpiece is running according to a preferred embodiment of the invention.
Figure 2:
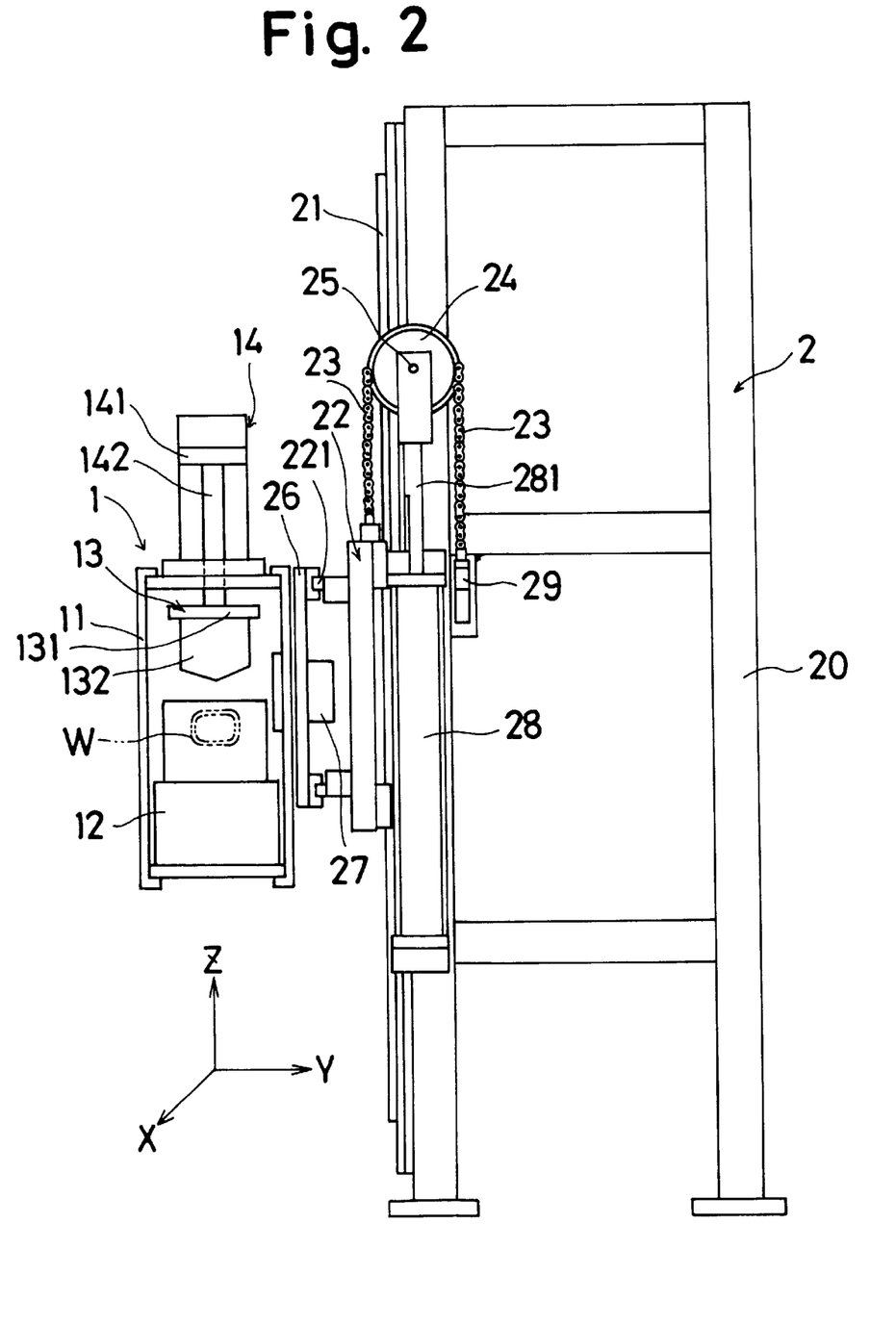
FIG. 2 is a side view showing a part of the apparatus when seen in a direction of arrow A in FIG. 1.
Figure 3:
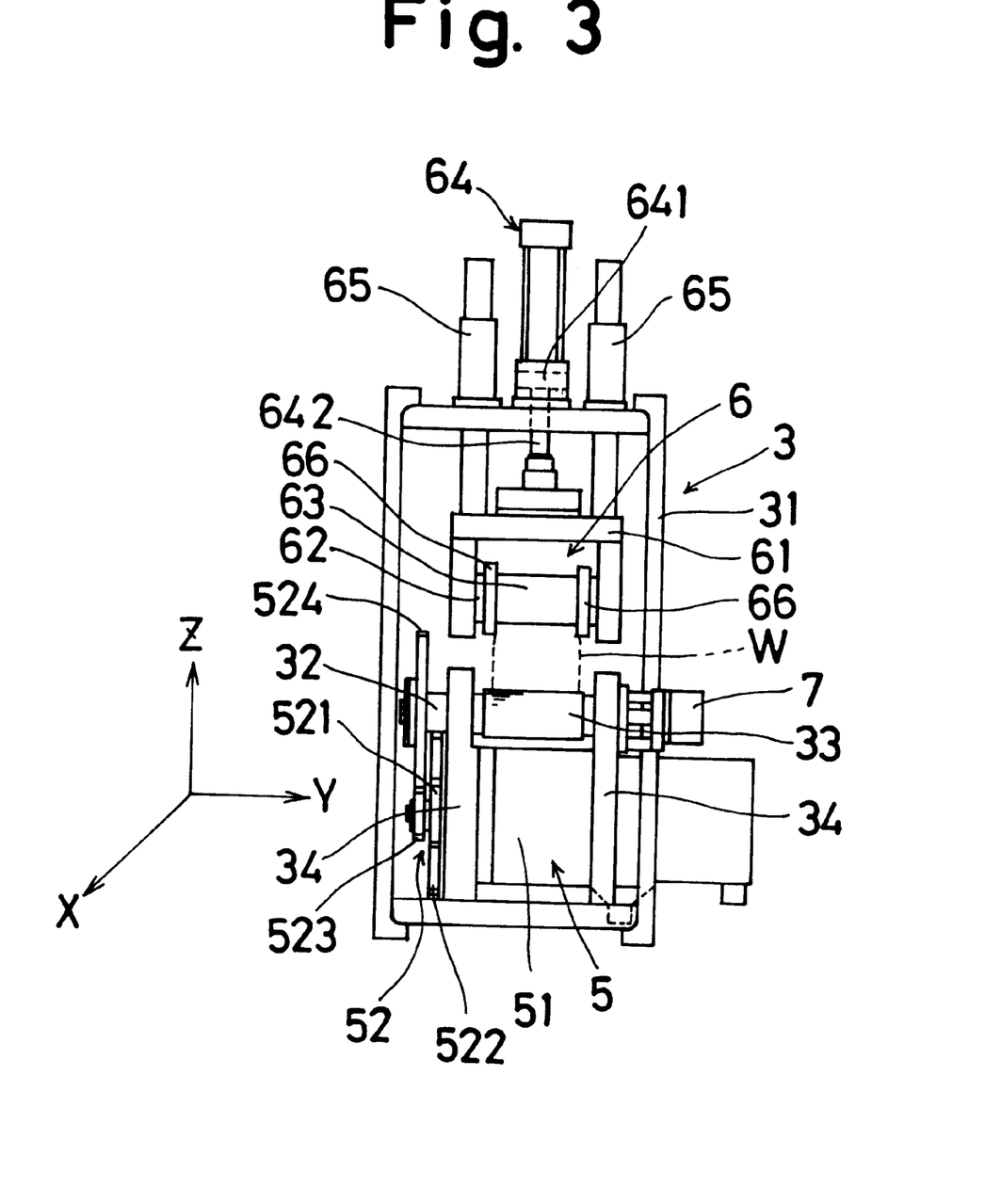
FIG. 3 is a side view showing another part of the apparatus when seen in a direction of arrow B in FIG. 1.

Referring to the FIGS. 1 to 3, a cutting apparatus 10 for cutting a workpiece W while the workpiece is running includes a cutter 1 for cutting the running workpiece, a support member 2 for supporting the cutter 1 and a travel member 3 movable along the workpiece and in contact with the workpiece.

The workpiece W is curved with a prescribed curvature and runs in the direction of arrow R with a constant speed. The workpiece is hollow in this embodiment but may be solid. The workpiece curvature may change along its length.

The support member 2 includes a stand 20. A cylinder 28 is attached to the stand 20. The pulley 24 is rotatably mounted to the cylinder rod 25 via a shaft pin 281 extending in the X direction in FIG. 2. The movable pulley 24 is movable in the Z direction by the cylinder 28.

A chain 23 is wound around the movable pulley 24. One end of the chain 23 is connected to the fixed pin 29 secured on the stand 20 and the other end of the chain 23 is connected to a sliding member 22 movable in the Z direction in a vertical guide rail 21. The guide rail 21 is united with the stand 20. The sliding member 22 is therefore moved by the chain 23 according to the movement of the pulley 24.

A pair of guide rails 221 are formed on the sliding member 22 and extend in the X direction in FIG. 2. A sliding member 26 is guided in the X direction on the guide rails 221. A shaft bar 27 is secured on the sliding member 26 and extends in the Y direction in FIG. 2.

The cutter 1 includes a housing 11, a stationary lower mold 12, a movable upper mold 13 and a hydraulic cylinder 14. As shown in FIG. 2, the housing 11 connects the stationary mold 12 and the movable mold 13 and is supported for rotation around the shaft bar 27. That is, the housing 11 is movable in the Z direction in FIG. 2 by the sliding member 22 and in the X direction in FIG. 2 by the sliding member 26.

The stationary mold 12 is secured on the housing 11, holds the workpiece W thereon and receives a load when the workpiece is cut. The movable mold 13 is supported by the housing 11 so as to be movable in the Z direction in FIGS. 1 and 2. The movable mold 13 is constituted by a body 131, a cutting edge 132 and a guide portion 133. The cutting edge 132 cuts the workpiece and is secured on the bottom of the body 131. The stationary mold 12 is formed with a cutter guide groove 121 for guiding the cutting edge 132. The guide portion 133 guides the workpiece when the workpiece is subject to cutting and is secured on the bottom face of the body 131. The hydraulic cylinder 14 drives the movable mold 13 and includes a piston 141 and a rod 142 connecting between the piston 141 and the body 131. The hydraulic cylinder 14 operates according to instructions from a control unit or controller 9.

As shown in FIGS. 1 and 3, the travel member 3 is constituted by a housing 31, a rotary shaft 32 and a drive roller 33 serving as a rotary member. The housing 31 is secured to the housing 11 of the cutter 1 by a positioning plate 4 and contains the rotary shaft 32, the drive roller 33, a drive roller drive apparatus as described below, a part of a first workpiece pushing member 6, an encoder 7 as described below, and a part of a second workpiece pushing member 8.

The positioning plate 4 is swingably held on the housing 11 of the cutter 1 at point C in FIG. 1 by a pin and a bearing (not shown). The housing 11 is unitedly formed with a flange 111 projecting toward the travel member 3. A pair of slots 112 formed in the flange 111 extend in the swinging direction of the positioning plate 4. The slots 112 respectively guide bolts 41 inserted in the positioning plate 4. When loosened, the bolts 41 permit the drive roller 33 to move to a position in contact with the workpiece W. When tightened, they secure the positioning plate 4 to the housing 11 of the cutter 1.

The housing 31 of the travel member 3 is also formed with pair of slots 311 extending in the swinging direction of the positioning plate 4. The slots 311 respectively guide bolts 42 inserted in the positioning plate 4. When loosened, the bolts 42 permit the encoder 7 to move to a position at which the encoder 7 is in contact with the workpiece W. When tightened, they secure the positioning plate 4 to the housing 31 of the travel member 3.

The rotary shaft 32 is rotatably held by a pair of supporting plates 34 secured in the housing 31 and extends in the Y direction in FIGS. 1 and 3. The drive roller 33 is formed around and unitedly with the rotary shaft 32 and is in contact with the entire bottom face of the workpiece W. The driver roller 33 causes the housing 31 to run along the workpiece by rotating in contacting with the workpiece. The supporting plates 34 also prevent the drive roller 33 from rattling in the Y direction in FIG. 3.

The drive roller drive apparatus 5 includes a motor 51 and a speed reduction mechanism 52. The motor 51 is secured to the housing 31 and an output shaft of the motor 51 extends in the Y direction in FIG. 3. The motor 51 is electrically connected to the controller 9. The speed reduction mechanism 52 is electrically connected to the controller 9 and is constituted by first to fourth gears 521 to 524. The first gear 521 is secured to the output shaft of the motor 51; the second gear 522 is secured to an auxiliary rotary shaft (not shown) disposed parallel to the output shaft of the motor 51 and engages the first gear 521; the third gear 523 is secured to the auxiliary rotary shaft; the fourth gear 524 is secured to the rotary shaft 32 and engages the third gear 523. The speed reduction ratio is 1 to 11.6 in this embodiment.

The first workpiece pushing member 6 applies a certain contact pressure between the drive roller 33 and the workpiece W by pushing the workpiece toward the drive roller 33 while the workpiece is running. The first workpiece pushing member 6 includes a travel body 61, a rotary shaft 62, a free roller 63, and a hydraulic cylinder 64. The travel body 61 is guided in the Z direction by two guide members 65 secured to the housing 31, i.e., toward and away from the workpiece.

The rotary shaft 62 is rotatably supported at both ends thereof by the travel body 61 and extends in the Y direction in FIGS. 1 and 3. The free roller 63 is formed unitedly around the rotary shaft 62 and is capable of contacting the entire top face of the workpiece. The free roller 63 is driven by the drive roller 32. A pair of supporting plates 66 are formed unitedly on both sides of the free roller 63 to prevent the workpiece from rattling in the Y direction.

The hydraulic cylinder 64 drives the travel body 61 and has a piston 641 and a rod 642 extending between the piston 641 and the travel body 61. The hydraulic cylinder 64 is also driven according to instructions from the controller 9.

The encoder 7 measures the running length of the workpiece W and rotates by being driven by the workpiece while contacting the entire bottom face of the workpiece. The encoder 7 outputs length information of the workpiece to the controller 9. Thus since the encoder 7 is mounted to the travel member 3 secured to the cutter 1, the cutting position of the workpiece is precisely detected.

Figure 4A:
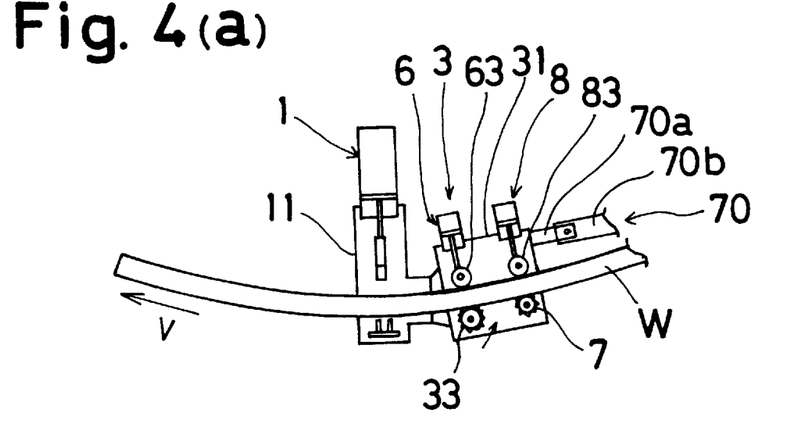
FIGS. 4(a) to 4(c) are illustrations showing a method for cutting a workpiece while the workpiece is running according to a preferred embodiment of the invention.

An initial position detector 70 detects the return of the cutter 1 to the initial position thereof and outputs the information to the controller 9. The initial position detector 70 is constituted of a movable portion 70a secured to the housing 31 and a stationary portion 70b set at the initial position as shown in FIG. 4(a).

The second workpiece pushing member 8 provides a prescribed pressure between the encoder 7 and the workpiece W by pushing the workpiece toward the encoder 7 while the workpiece is running. The second workpiece pushing member 8 includes a travel body 81, a rotary shaft (not shown), a free roller 83 and a hydraulic cylinder 84. Since the travel body 81, the rotary shaft, the free roller 83 and the hydraulic cylinder 84 of the second workpiece pushing member 8 have substantially the same constitution as the corresponding parts of the first workpiece pushing member 6, their description is omitted for the sake of simplicity.

The controller 9 stores information sent from the encoder 7 and the initial position detector 70, and a target workpiece length corresponding to the position at which the workpiece W is to be cut. The controller 9 compares the information of the workpiece length from the encoder 7 with the target length, drives the motor 51 so that the drive roller 33 is rotated in the opposite direction to the running direction of the workpiece with the same speed as the running speed of the workpiece until the workpiece length information from the encoder 7 reaches the target length, and at the same time actuates the hydraulic cylinders 64,84 in a direction such that the free rollers 63,83 are pushed toward the workpiece.

The controller 9 stops the motor 51 when the workpiece length information from the encoder 7 reaches the target length. Right after this it makes the hydraulic cylinder 14 move the cutting edge 132 upward and then drives the motor 51 so that the drive roller 33 is rotated in the opposite direction of the workpiece W at twice the running speed of the workpiece. The controller 9 also drives the motor 51 so that the driver roller 33 is rotated in the opposite direction to the running direction of the workpiece with the same speed as the running speed of the workpiece when the cutter 1 returns to the initial position thereof.

Figure 4B:
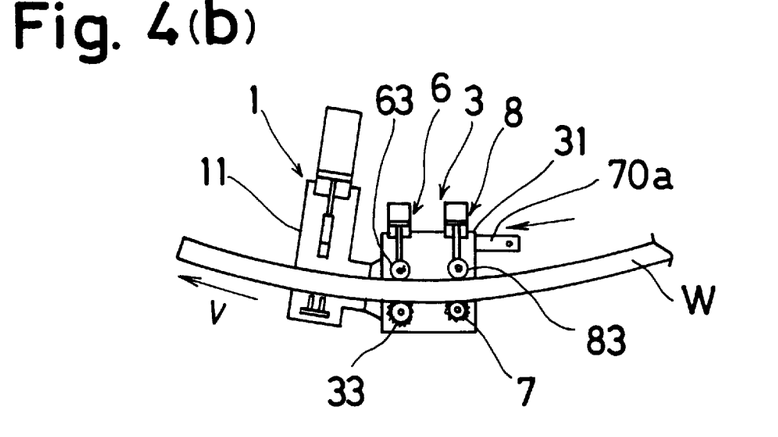
Figure 4C:
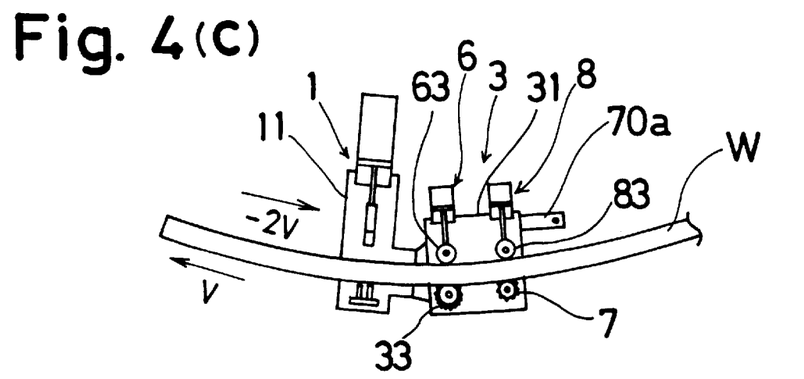

Referring to FIGS. 4(a) to 4(c), a method for cutting a running workpiece using the cutting apparatus 10 is described.

First, as shown in FIG. 4(a), the hydraulic cylinders 64, 84 of the first and second workpiece pushing members 6, 8 are caused to move down by the controller 9, thereby pushing the free rollers 63, 83 toward the drive roller 33 and the encoder 7, and thereby providing contact pressures between the drive roller 33 and the workpiece W and between the encoder 7 and the workpiece. The workpiece of post roll molding is made to run in the left direction in FIG. 4(a) by a feeding apparatus (not shown), and the encoder 7 detects the workpiece length at that time. The motor 51 is driven by the controller 9 so that the drive roller 33 is rotated in the opposite direction to the running direction of the workpiece with the same speed as the running speed of the workpiece until when the workpiece length information from the encoder 7 reaches the target length, and then the cutter 1 is stopped at its initial position.

When the workpiece length information from the encoder 7 reaches the target length, as shown in FIG. 4(b), the controller 9 stops the motor 51 and causes the cutter 1 to run together with the workpiece. The controller 9, right after this operation, moves the hydraulic cylinder 14 of the cutter of the cutter 1 down, thereby moving the cutting edge 132 down to cut the workpiece W at the prescribed position thereof.

After finishing the cutting of the workpiece W, the controller 9 drives the hydraulic cylinder 14 to move it up. The controller 9, right after this, drives the motor 51 so that the drive roller 33 is rotated in the opposite direction to the running direction of the workpiece with the twice the speed of the running speed of the workpiece, thereby moving the cutter 1 in the opposite direction to the running direction of the workpiece as shown in FIG. 4(c).

When the cutter 1 returns to the initial position, the controller 9 drives the motor 51 so that the drive roller 33 is rotated in the opposite direction to the running direction of the workpiece W with the same speed as the running speed of the workpiece, then makes the cutter 1 stop at the initial position and maintains the cutter 1 at the initial position until the next cutting period.

Figure 5:
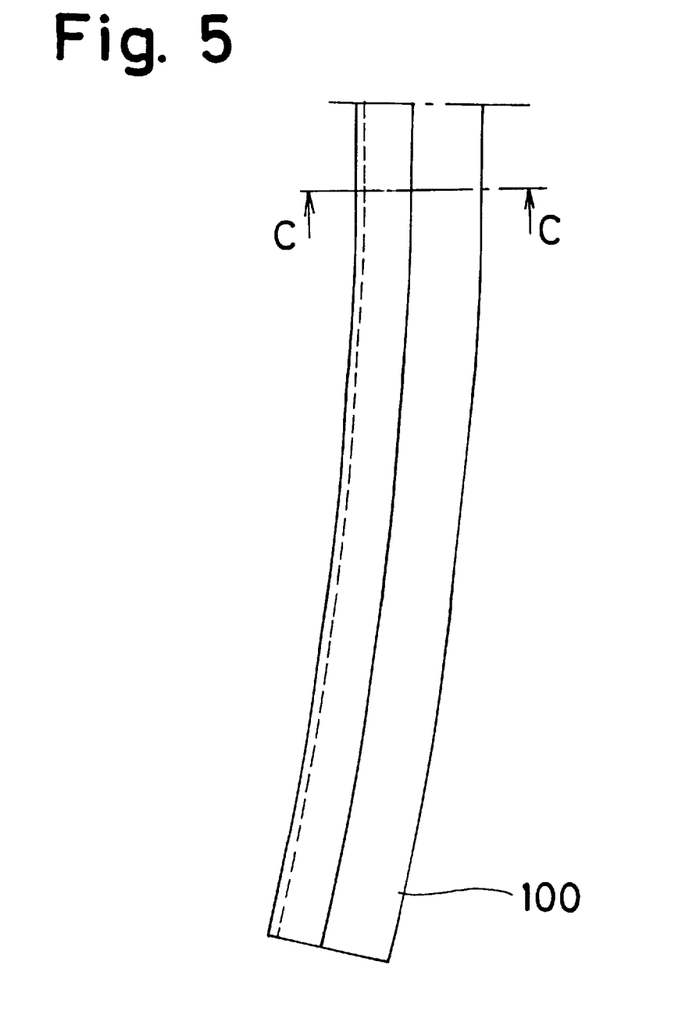
FIG. 5 is a front view showing a bumper for a vehicle to be cut by the apparatus shown in FIG. 1.
Figure 6:
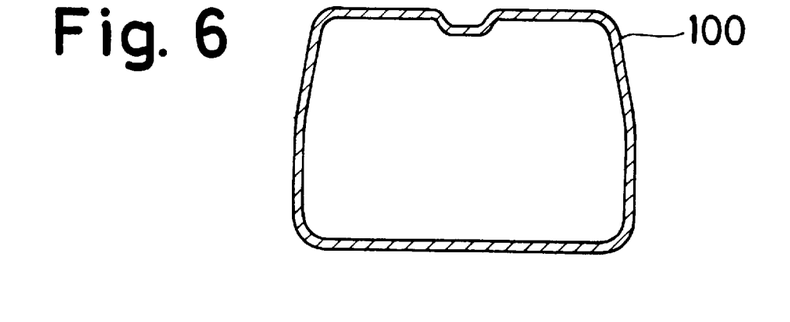
FIG. 6 is a cross section showing the bumper taken along C—C line in FIG. 5.

FIG. 5 shows a front view of a vehicle bumper manufactured using the cutting apparatus 10. FIG. 6 is a cross section taken along C—C line in FIG. 5. As shown in FIG. 5, the bumper 100 is curved with a predetermined curvature and is hollow, but the cutting apparatus 10 can be used for cutting workpieces in various forms while the workpieces are running, although in this embodiment the hollow bumper 100 is shown as an example.

The apparatus according to this embodiment, though having a simple constitution, allows the cutter to follow and cut the workpiece while the workpiece is running even when the workpiece is curving or has a curvature changing rather than remaining constant, because the travel member movable along the workpiece in contact with the workpiece is secured to the cutter. Where the travel member includes the housing secured to the cutter and the drive roller serving as a rotary member, the drive roller allows the cutter and the housing to run smoothly because the drive roller rotates in contact with the workpiece. The pushing member pushes the workpiece toward the drive roller while the workpiece is running, thereby providing a predetermined contact pressure on the drive roller, and thereby preventing the drive roller from separating from the workpiece while the cutter is driven. Since the drive roller is in contact with the bottom of the workpiece, the weight of the travel member is not applied to the workpiece.

With the cutting apparatus according to this embodiment, the drive roller is stopped while the workpiece is cut, so the cutter can be made synchronous with the workpiece by the contact pressure of the pushing members. When the workpiece is not being cut, the drive roller is rotated with a higher speed than the running speed of the workpiece in the opposite direction to the running direction of the workpiece, so that the cutter can be returned at the initial position. Moreover, when the cutter is returned to the initial position, the drive roller is rotated in the opposite direction to the running direction of the workpiece with the same speed as the running speed of the workpiece, so that the cutter can be maintained at the initial position. The pushing member includes the free roller rotating in contact with the workpiece, so that the cutter can be driven smoothly.

Second Embodiment

Referring to FIGS. 7 to 10, a cutting apparatus 10a for cutting a running workpiece W while the workpiece is running, whose cutter is two-dimensionally movable, has a cutter 1, a travel member 3, first and second pushing members 6 and 8 and an encoder 7 that are substantially the same as those of the cutting apparatus 10 according to the first embodiment. The descriptions of these elements are therefore omitted for the sake of simplicity.

Figure 7:
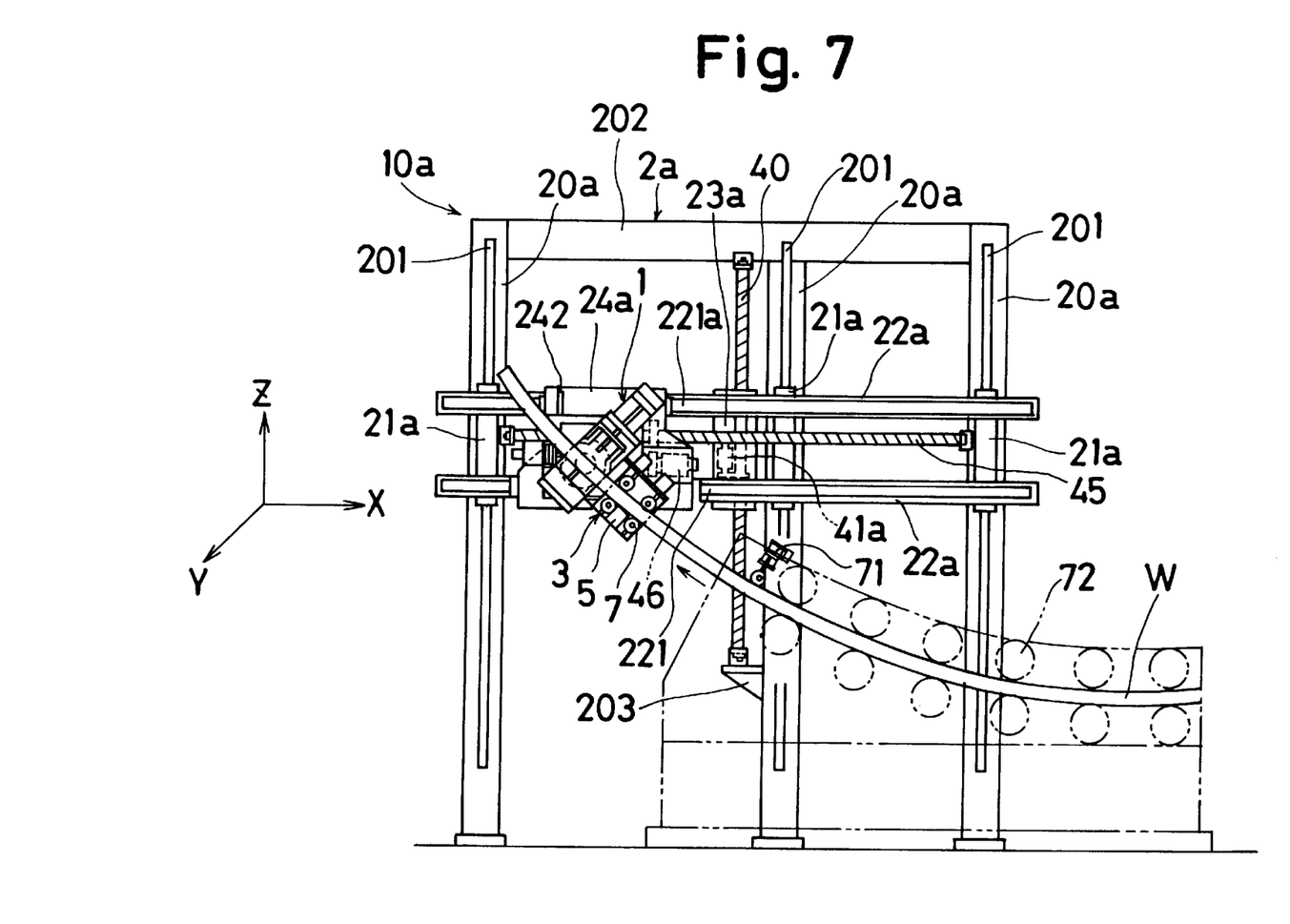
FIG. 7 is a front view showing an apparatus for cutting a workpiece while the workpiece is running according to a second embodiment of the invention.

The cutter housing 11 is supported by a support member 2a which supports the housing 11 for two-dimensional movement in a X-Z plane and for rotation around a Y-axis. As shown in FIG. 7, the support member 2a includes six stands 20a, only three of which are located on the near side are shown, each of which is formed unitedly with a vertical guide rail 201 extending in the Z direction. Each guide rail 201 guides a first travel member 21a along the rail 201 in the Z direction. Each first travel member 21a has two legs 211 (FIG. 8) and is supported on the guide rail 201 via the legs 211.

A pair of connection members 22a extending in the X direction parallel to one another are secured to the two travel members 21a of the first travel member. The connection members 22a are also secured to the traveling plate 23a of the first travel member.

Figure 8:
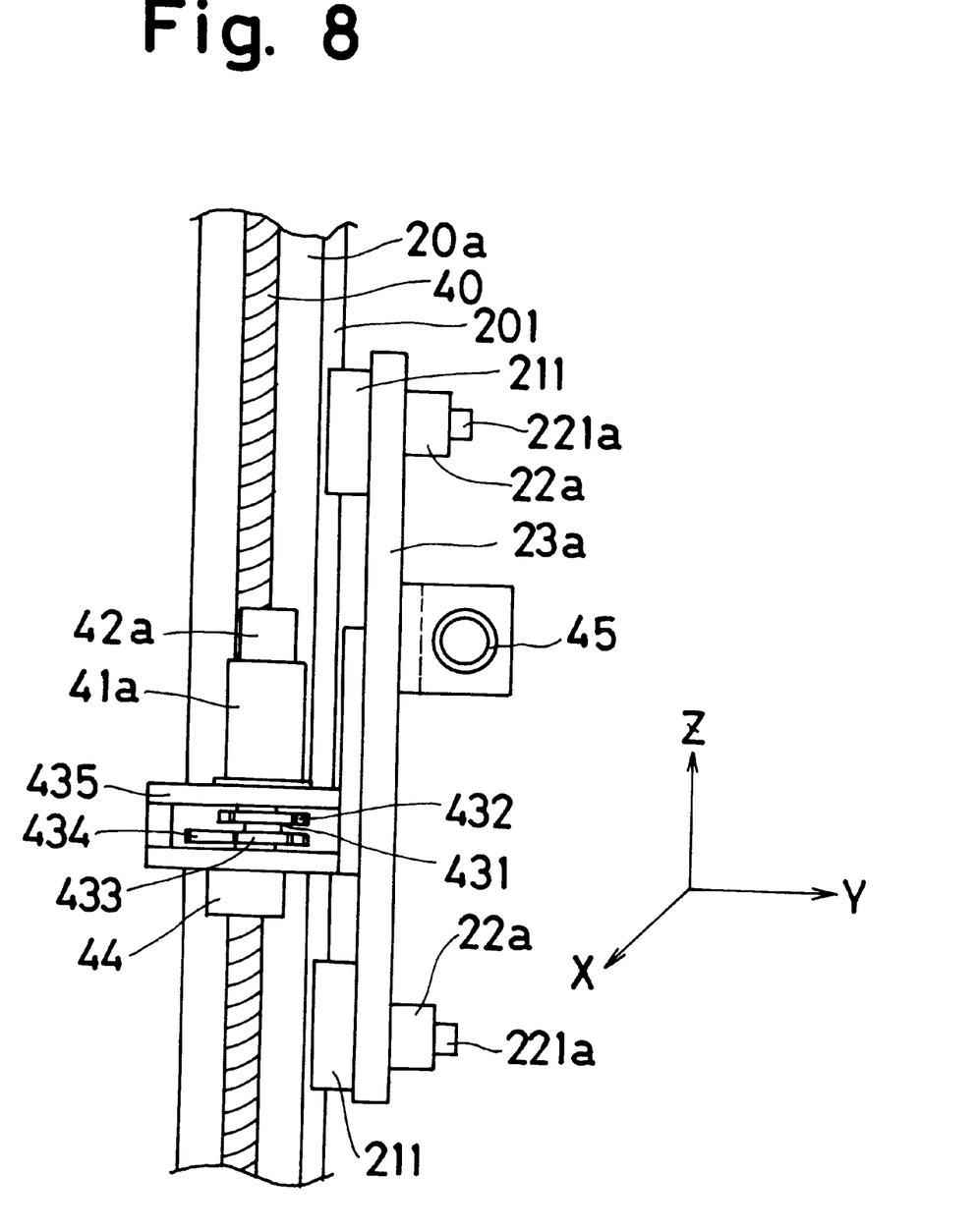
FIG. 8 is a side view showing a support member in the apparatus shown in FIG. 7.

A top beam 202 is secured at the top ends of the stands 20a and a bottom bracket 203 are fixed to the lower portion of the center stand 20a. A first ball screw 40 is secured between the top beam 202 and the bottom bracket 203 and extends near and parallel to the center stand 20a. Referring to FIG. 8, a nut (not shown) is rotatably mounted to the threaded rod of the first ball screw 40. The nut is rotatably driven by a first motor 41a and so is raised or lowered. The rotational speed of the first motor 41a is detected by a first encoder 42a. A gear 431 is secured around the output shaft of the first motor 41a and engages a gear 432 secured around a rotary shaft, not shown but arranged parallel to the output shaft of the first motor 41a. A gear 433 is secured around the rotary shaft and engages a gear 434 secured around the first ball screw 40. The gears 431 to 434 constitute a speed reduction mechanism and are housed in a gear box 435. The gear box 435 supports the first motor 41a and is secured to the traveling plate 23a as described above.

A sliding cylinder 44 is secured to the gear box 435 and arranged movably along the first ball screw 40 together with a nut which is mounted to the first ball screw 40. Accordingly, when the first motor 41a is rotated in one direction, the nut attached to the first ball screw 40 is rotated by way of the gears or speed reduction mechanism 431 to 434 to move the sliding cylinder 44 in the Z direction, thereby moving the traveling plate 23a as well as the gear box 435 in the Z direction. The first encoder 42a also detects the position of the traveling plate 23a.

The pair of connection members 22a are formed unitedly with guide rails 221a, which extend in a direction perpendicular to the extending direction of the guide rails 201, i.e., in the X direction. The guide rails 221a guide a second travel member 24a along the guide rails 221a in the X direction.

Figure 9:
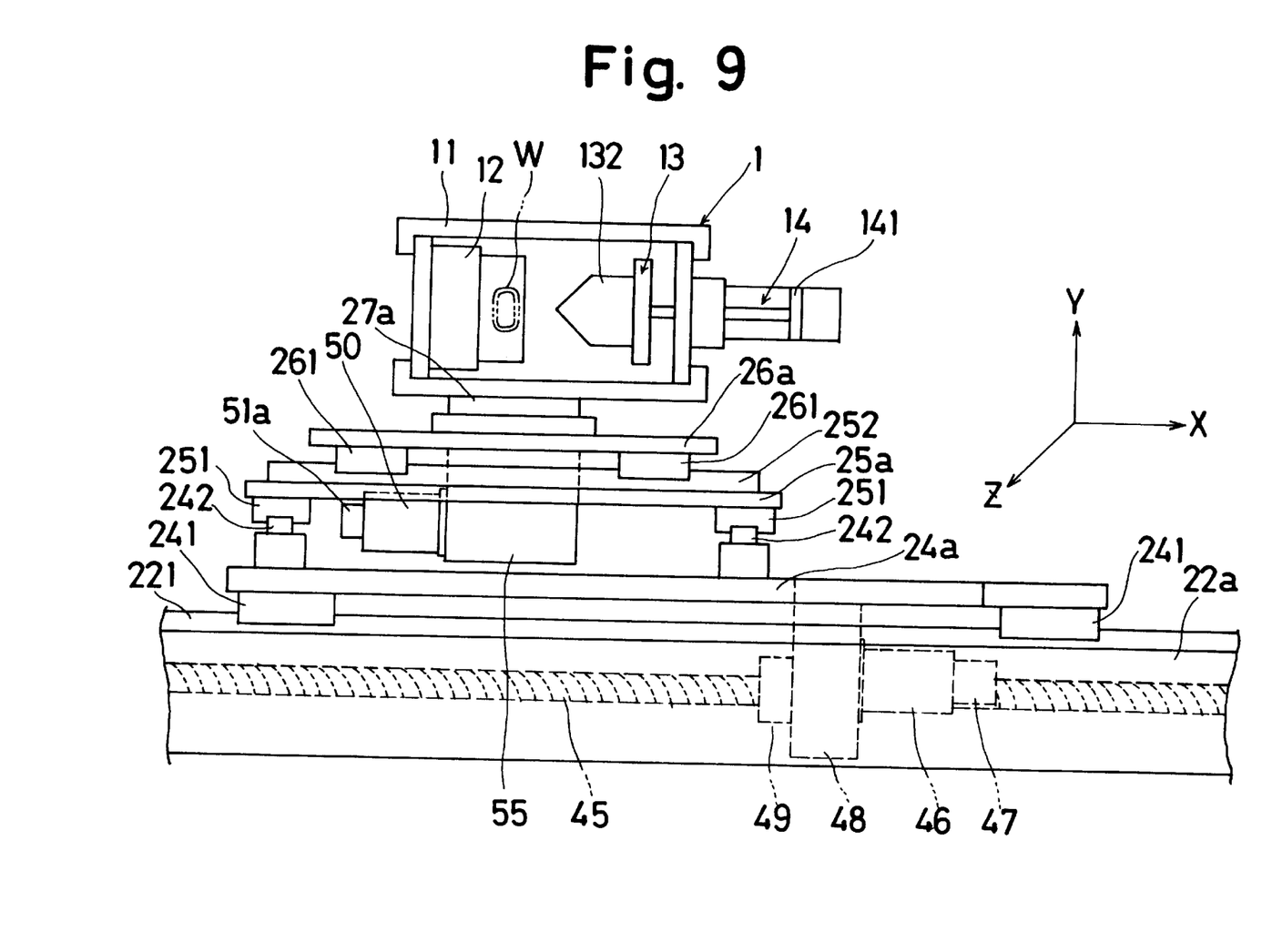
FIG. 9 is a side view showing a cutter and travel members in the apparatus shown in FIG. 7.

The second travel member 24a has four legs 241 shown only in FIG. 9 and is supported by each of the guide rails 221a via two of the legs 241.

A second ball screw 45 is secured to opposite ends of the travel members 21a and extends in a direction perpendicular to the extending direction of the first ball screw 40, i.e., in the X direction. A nut, not shown, is rotatably mounted to the threaded rod of the second ball screw 45. The nut is rotatably driven by a second motor 46 and so moves along the ball screw. The rotational speed of the second motor 46 is detected by a second encoder 47. The second motor 46 is connected to the nut engaging the second ball screw 45 by a speed reduction mechanism, not shown, constituted in substantially the same way as the speed reduction mechanism placed between the first motor 41a and the first ball screw 40 described above.

The speed reduction mechanism is housed in a gear box 48. The gear box 48 supports the second motor 46 and is secured to the second travel member 24a. A sliding cylinder 49 is secured to the gear box 48 and arranged movably along the second ball screw 45 together with a nut mounted to the second ball screw 45. Accordingly, when the second motor 46 is rotated in one direction, the nut engaging the second ball screw 45 is rotated by way of the speed reduction mechanism to move the sliding cylinder 49 in the X direction, thereby moving the second travel member 24a as well as the gear box 48 in the X direction. The second encoder 47 also detects the position of the second travel member 24a.

As shown in FIG. 9, the second travel member 24a is formed unitedly with a pair of guide rails 242, which are separated from one another and extend in the Z direction. Those guide rails 242 guide a first movable plate 25a along the guide rails 242. The first movable plate 25a has four legs 251 (only two of them are shown) and is supported to the guide rails 242 by the legs 251. The first movable plate 25a is movable in the same direction as the first travel member 21a and the traveling plate 23a but has a significantly smaller movement range than the first travel member 21a and the traveling plate 23a.

The first movable plate 25a is formed unitedly with a pair of guide rails 252, though only one of them is shown, which are separated from one another and extend in the X direction. A second movable plate 26a is guided by the guide rails 252 along the guide rails 252. The second movable plate 26a has four legs 261 (only two of them are shown) and is supported by the guide rails 252 by the legs 261. The second movable plate 26a is movable in the same direction as the second travel member 24a but has a significantly smaller range of movement.

The first and second movable plates 25a, 26a are free and no motor drives the plates 25a, 26a. A shaft bar 27a extending in the Y direction is rotatably supported by the first and second movable plates 25a, 26a. The shaft bar 27a is secured to the housing 11 of the cutter 1 and supports the housing 11 so that the housing 11 can be rotated together with the shaft bar 27a.

Figure 10:
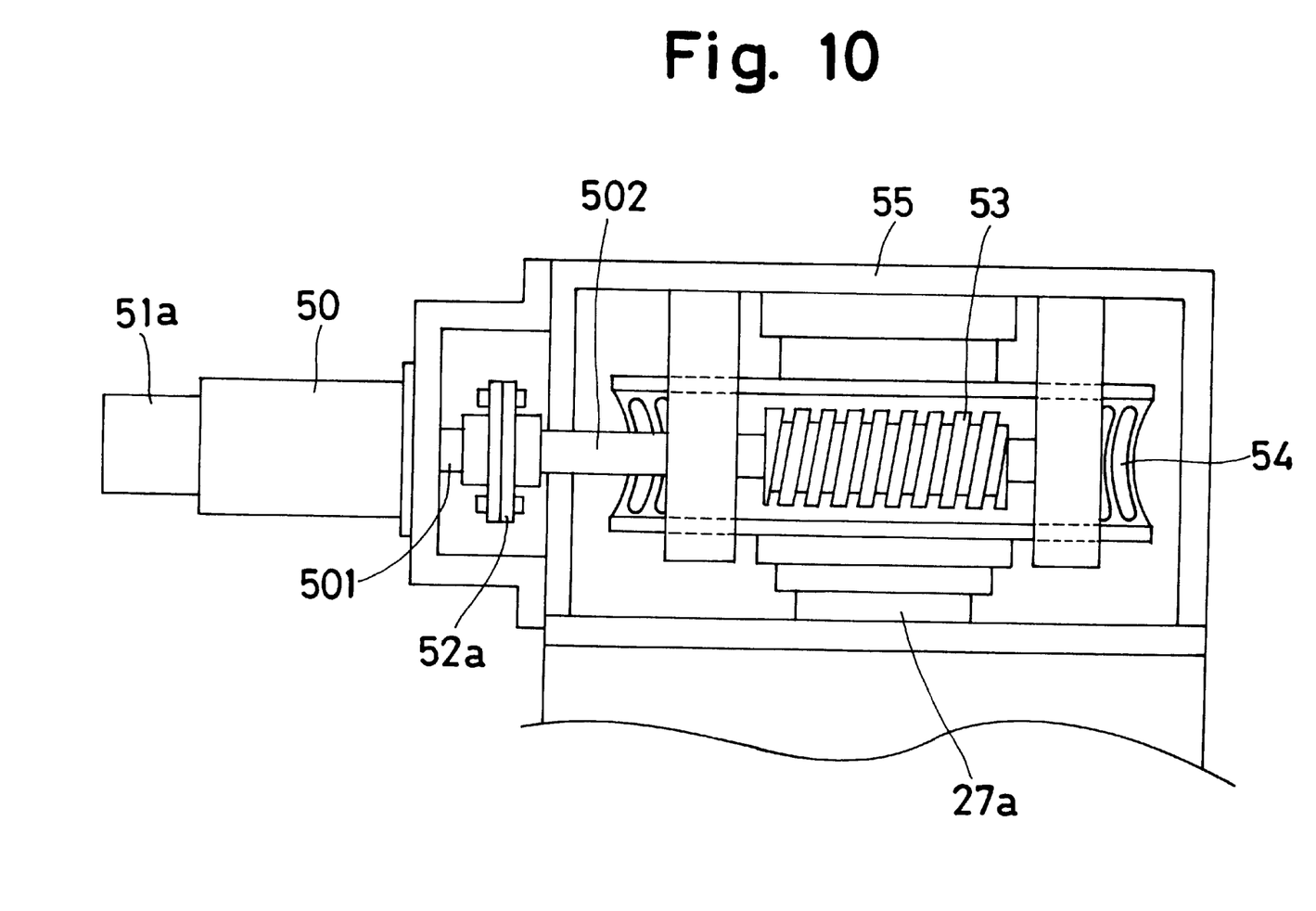
FIG. 10 is a side view showing a gear box and its vicinity in the apparatus shown in FIG. 7.
Figure 11:
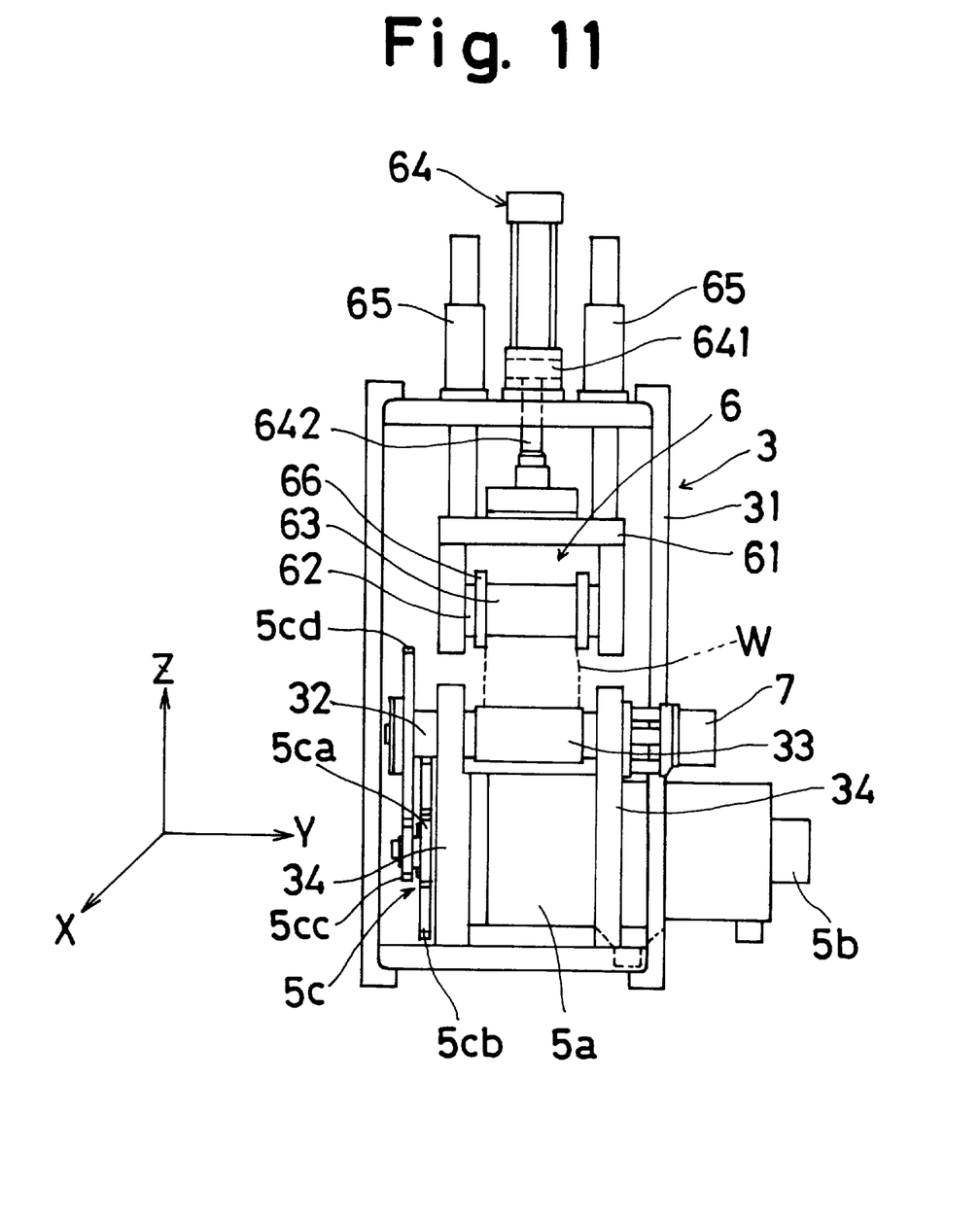
FIG. 11 is a side view showing a travel member in the apparatus shown in FIG. 7.

The shaft bar 27a is driven by a third motor 50 whose rotational speed is detected by a third encoder 51a. As shown in FIG. 10, an output shaft 501 of the third motor 50 is secured to a rotary shaft 502 formed coaxially to the output shaft 501 by way of a joint member 52a. A worm gear 53 is secured around the rotary shaft 502. The worm gear 53 engages a worm wheel 54 secured around the shaft bar 27a. The worm gear 53 and the worm wheel 54 are housed in a gear box 55 which supports the end of the shaft bar 27a.

A drive roller drive apparatus 5' includes a fourth motor 5a, a fourth encoder 5b and a speed reduction mechanism 5c.

The fourth motor 5a is secured to the housing 31, and an output shaft of the motor 5a extends in the Y direction. The fourth encoder 5b detects the rotational speed of the fourth motor 5a. The speed reduction mechanism 5c is constituted of first to fourth gears 5ca, 5cb, 5cc, 5cd. The first gear 5ca is secured around the output shaft of the fourth motor 5a; the second gear 5cb is secured around an auxiliary rotary shaft not shown but disposed parallel to the output shaft of the fourth motor 5a and engages the first gear 5ca; the third gear 5cc is secured around the auxiliary rotary shaft; the fourth gear 5cd is secured around the rotary shaft 32 and engages the third gear 5cc. The reduction ratio is 1 to 11.6 in this embodiment.

An encoder 71 for detecting workpiece speed is attached to the center stand 20a of the support member 2a. The encoder 71 detects the running speed of the workpiece W and outputs its information to the controller 9a.

Figure 12:
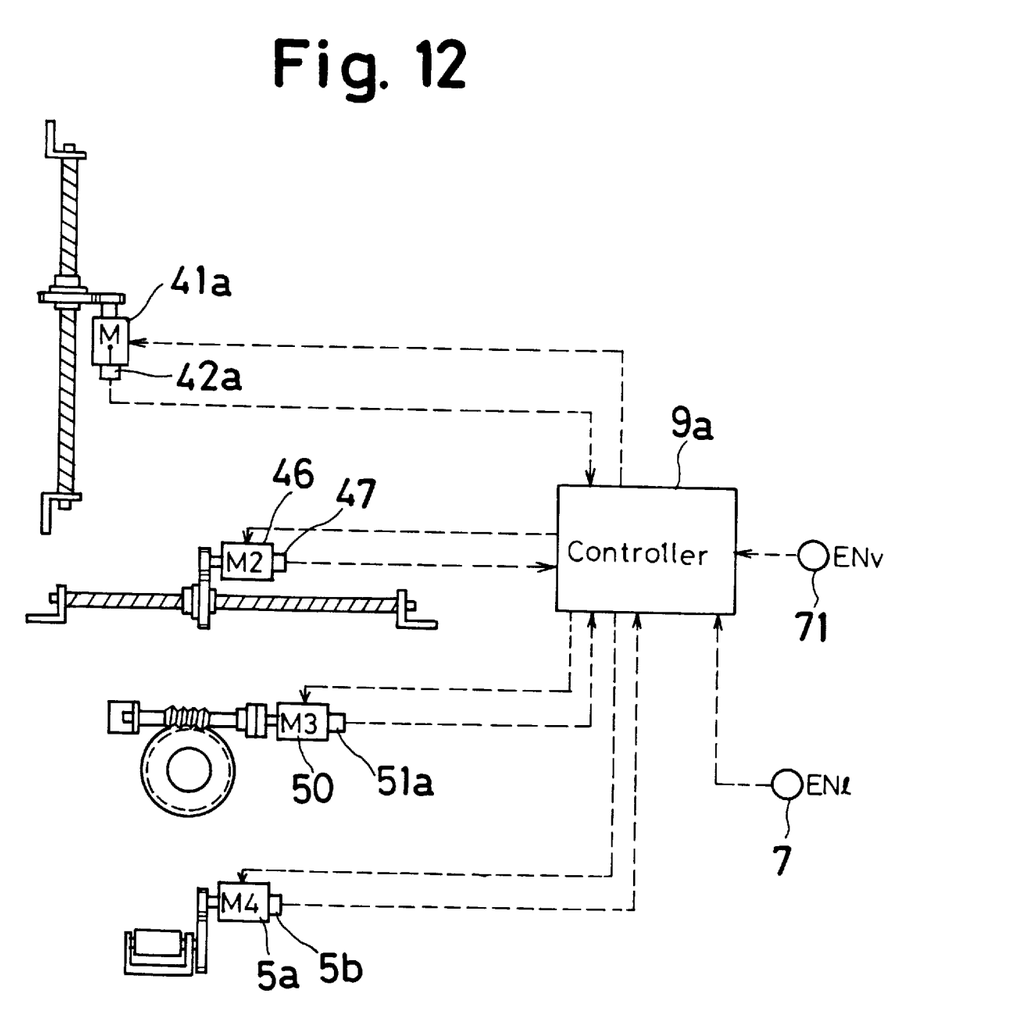
FIG. 12 shows a relation among four motors, six encoders and a controller in the apparatus shown in FIG. 7.

As shown in FIG. 12, the controller 9a receives the rotational speed information of the first to fourth motors 41a, 46, 50, 5a detected by the first to fourth encoders 42a, 47, 51a, 5b, respectively, the workpiece length information from the encoder 7, and the workpiece speed information from the encoder 70. The controller 9a stores the target workpiece length corresponding to the cutting position of the workpiece. The controller 9a compares the workpiece length information with the target length, drives the fourth motor 5a so that the drive roller 33 is rotated in the opposite direction to the running direction of the workpiece with the same speed as the running speed of the workpiece, while keeping the first to third motors 41a, 46, 50 stopped until when the workpiece length information reaches the target length or until the cutting position of the workpiece arrives, and at the same time actuates the hydraulic cylinders 84 to operate in a direction such that the free rollers 63, 83 are pushed toward the workpiece.

The controller 9a, when the workpiece length information reaches about the target length, makes the first to third motors 41a, 46, 50 drive and the fourth motor decelerate so that the cutter 1 is made synchronous with the workpiece W, or namely, makes the running speed of the cutter 1 coincide with the running speed of the workpiece detected by the encoder 71. The controller 9a makes the fourth motor 5a stop when the workpiece length information reaches the target length and, right after this, makes the hydraulic cylinder 14 of the cutter 1 move downward so that the cutting edge 132 moves down. The controller 9a, after finishing cutting, drives the hydraulic cylinder 14 upward, and right after this, drives the first to third motors 41a, 46, 50 so that the cutter 1 returns to the initial position as well as driving the fourth motor 5a so that the drive roller 33 is rotated in the opposite direction to the running direction of the workpiece W with the twice speed as the running speed of the workpiece. The controller 9a, when the cutter 1 returns to the initial position thereof, stops the first to third motors 41a, 46, 50 as well as driving the fourth motor 5a so that the drive roller 33 is rotated in the opposite direction to the running direction of the workpiece with the same speed as the running speed of the workpiece.

In operation, the hydraulic cylinders 64, 84 of the first and second workpiece pushing members 6, 8 are operated to move down by the controller 9a, thereby pushing the free rollers 63, 83 toward the drive roller 33 and the encoder 7 by way of the workpiece, and thereby providing contact pressures between the drive roller 33 and the workpiece W and between the encoder 7 and the workpiece. The workpiece of post roll molding is, in this situation, made to run in the arrow direction in FIG. 7 by a feeding apparatus 72, and while the first to third motors 41a, 46, 50 are stopped, the fourth motor 5a is driven so that the drive roller 33 is rotated in the opposite direction to the running direction of the workpiece with the same speed as the running speed of the workpiece. The encoder 7 detects the workpiece length at that time. The fourth motor 5a is driven with the same speed while the first to third motors 41a, 46, 50 are kept stopped until the workpiece length information from the encoder 7 reaches the target length, and thereby the cutter 1 is stopped at the initial position thereof.

When the workpiece length information reaches approximately the target length, the first to third motors 41a, 46, 50 are so driven that the running speed of the cutter 1 coincides with the running speed of the workpiece; the first travel member 21a and the second travel member 24a are moved; the shaft bar 27a is rotated. The cutter 1 is thereby made synchronous with workpiece.

At the same time, the fourth motor 5a is controlled to reduce its speed. When the workpiece length information reaches the target length, or when the cutting position of the workpiece arrives, the fourth motor 5a is stopped while the first to third motors 41a, 46, 50 remain driven. The travel member 3 makes the cutter 1 travel together with the workpiece W at that time, and therefore the cutter 1 is maintained at the desirable cutting position of the workpiece. However, the second travel member 24a supported movably in the X direction at the first travel member 21a may be shifted more or less from the position of the cutter 1, because the second travel member 24a does not travel together with the workpiece.

In this embodiment, the first and second movable plates 25a, 26a supporting the cutter 1 on the second travel member 24a move two-dimensionally in a direction such that the positional shift is reduced, thereby absorbing the positional shift between the second travel member 24a and the cutter 1. As a result, the load exerted on the cutter 1 due to the positional shift is reduced significantly. The hydraulic cylinder 14 of the cutter 1 is moved downward with the cutter 1 driven unitedly with the workpiece, thereby moving the cutting edge 131 downward to cut the workpiece at the desired position.

When the cutter 1 finishes cutting the workpiece, the hydraulic cylinder 14 is driven upward. The first to third motors 41a, 46, 50 are driven to return the cutter 1 to the initial position and the fourth motor 5a is driven so that the drive roller 33 is rotated in the opposite direction to the running direction of the workpiece with twice the running speed of the workpiece, thereby driving the cutter 1 in the opposite direction to the running direction of the workpiece.

When the first and second encoders 42a, 47 detect that the cutter 1 returns to the initial position, the first to third motors 41a, 46, 50 are stopped and the fourth motor 5a is driven to rotate the drive roller 33 in the opposite direction to the running direction of the workpiece with the same speed as the running speed of the workpiece, thereby stopping the cutter 1 at the initial position thereof, and keeping the cutter 1 at that position until the next cutting period.

In this embodiment, the support member 2a supports the cutter 1, and therefore the weight of the cutter 1 to be applied to the workpiece becomes lighter. Accordingly, the post-cutting quality of the workpiece is not impaired. Moreover, the travel member 3 allows the cutter 1 to travel together with the workpiece during cutting, so that the workpiece can be cut at desired positions while the workpiece is running.

According to this embodiment, the apparatus allows the cutter to follow not only a straight workpiece but also one which curves with a changing curvature. As a result, the apparatus can cut workpieces of any form while the workpiece is running.

It is to be noted that the cutting apparatus according to the invention can be designed to work with a cutter for cutting while the workpiece is running, the workpiece continuously supplied to run in a direction, and a clamping apparatus for clamping the workpiece and the cutter only when the workpiece is cut and for causing the cutter to run together with the workpiece.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not to be limited to by the specification, but be defined by the claims set forth below.

What is claimed as new and is desired to be secured by Letters Patent of the United States is:

1. An apparatus for cutting a workpiece while the workpiece is running, comprising:

a cutter for cutting a workpiece;

a travel member secured to the cutter and movable with the cutter along the workpiece while in contact with the workpiece, wherein the travel member includes a housing secured to the cutter and a rotary member rotatably supported by the housing and in contact with the workpiece;

a rotary member drive apparatus connected to said rotary member so as to drive said rotary member to cause the housing to run along the workpiece; and a controller connected to said rotary member drive apparatus for driving said rotary member drive apparatus such that the rotary member drive apparatus stops the rotary member when the workpiece is being cut and, when the workpiece is not being cut, actuates the rotary member to rotate in a direction opposite to a running direction of the workpiece and with a higher speed than a running speed of the workpiece until the cutter returns to an initial position thereof, and in an opposite direction to the running direction of the workpiece with the same speed as the running speed of the workpiece when the cutter returns to an initial position thereof.

2. The apparatus according to claim 1, further comprising a pushing member for pushing the workpiece toward the rotary member while the workpiece is running.

3. The apparatus according to claim 2, wherein the pushing member includes a travel body supported by the housing for movement toward and away from the workpiece, and a free roller rotatably supported by the housing and in engagement with the workpiece.

4. An apparatus for cutting a workpiece while the workpiece is running, comprising:

a cutter for cutting a workpiece;

a travel member secured to the cutter and movable with the cutter along the workpiece while in contact with the workpiece, wherein the travel member includes a housing secured to the cutter and a rotary member rotatably supported by the housing and in contact with the workpiece;

a rotary member drive apparatus connected to said rotary member so as to drive said rotary member to cause the housing to run along the workpiece; and rotary member drive apparatus control means for causing the rotary member drive apparatus to stop the rotary member when the workpiece is being cut and, when the workpiece is not being cut, for causing the rotary member drive apparatus to actuate the rotary member to rotate in a direction opposite to a running direction of the workpiece and with a higher speed than a running speed of the workpiece until the cutter returns to an initial position thereof, and in an opposite direction to the running direction of the workpiece with the same speed as the running speed of the workpiece when the cutter returns to an initial position thereof.

\* \* \* \* \*